United States Patent
Bayat et al.

(10) Patent No.: US 7,218,984 B1
(45) Date of Patent: May 15, 2007

(54) DYNAMICALLY DETERMINING YIELD EXPECTATION

(75) Inventors: Benjamin R. Bayat, Williston, VT (US); Raymond P. Mallette, Shelburne, VT (US); James G. Michael, Burlington, VT (US); Kathleen G. Purdy, Richmond, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/275,176

(22) Filed: Dec. 16, 2005

(51) Int. Cl.
*G06F 19/00* (2006.01)

(52) U.S. Cl. .................. 700/121; 702/117; 438/14

(58) Field of Classification Search .............. 700/121, 700/108–110; 438/14, 17, 18; 702/117, 702/81, 84
See application file for complete search history.

(56) References Cited

U.S. PATENT DOCUMENTS

| | | | |
|---|---|---|---|
| 3,751,647 A | 8/1973 | Maeder et al. | |
| 5,497,381 A | 3/1996 | O'Donoghue et al. | |
| 5,539,652 A | 7/1996 | Tegethoff | |
| 5,773,315 A | 6/1998 | Jarvis | |
| 5,777,901 A | 7/1998 | Berezin et al. | |
| 6,289,257 B1 | 9/2001 | Sekine | |
| 6,610,550 B1 | 8/2003 | Pasadyn et al. | |
| 6,618,682 B2* | 9/2003 | Bulaga et al. | ............. 702/84 |
| 6,701,477 B1 | 3/2004 | Segal | |
| 6,789,032 B2 | 9/2004 | Barbour et al. | |
| 7,089,138 B1* | 8/2006 | Bouchard et al. | ........... 700/121 |
| 2005/0074908 A1 | 4/2005 | Ciplickas et al. | |

* cited by examiner

*Primary Examiner*—Leo Picard
*Assistant Examiner*—Steven R. Garland
(74) *Attorney, Agent, or Firm*—Richard M. Kotulak, Esq.; Hoffman, Warnick & D'Alessandro LLC

(57) ABSTRACT

A yield expectation determination is dynamically provided during manufacturing of a lot of integrated circuits. In one embodiment, the determination includes initially establishing a yield expectation for a lot, which can be based on a process grade, and adjusting the yield expectation during manufacturing based on test data from the kerf of a wafer. In addition, the yield expectation can be adjusted based on inspection data from optical and SEM inspection tools during manufacturing. Correlation coefficient models that correlate kerf data and inspection data to a yield expectation adjustment are used to dynamically adjust the yield expectation, resulting in a more accurate yield projection during manufacturing. The correlation coefficient models and/or process grade estimates are updated based on actual yield from a previous lot, thus further improving yield expectation accuracy.

20 Claims, 5 Drawing Sheets

DYNAMICALLY DETERMINING YIELD EXPECTATION

BACKGROUND OF THE INVENTION

1. Technical Field

The invention relates generally to yield modeling, and more particularly, to a method, system and program product for dynamically determining a yield expectation during manufacturing of a lot of a product.

2. Background Art

Accurate yield expectation determination of a lot of integrated circuits (ICs) is a significant but difficult task in an IC manufacturing facility. For example, vertically integrated semiconductor fabrication of a forty-plus mask level microprocessor has a cycle time of approximately 120 days from a wafer start to shipping a tested module to the customer. Due to this cycle time, there is an uncertainty in projecting a yield to the customer. Overestimating yield will cause a supply shortfall and underestimating yield will result in inventory and lost revenue. IC fabricators presently use yield models based on critical area, circuit count, defect density data, and/or electrical test data to project yields. For example, U.S. Pat. No. 6,610,550, entitled "Methods and Apparatus for Correlating Error Model With Defect Data" discloses one of these methods. For semiconductor fabrication at the 90 nm node, yield is highly variable within a wafer lot and lot-to-lot, dependant on not only defect density but systematic detractors, wafer substrate, tool variations and process changes. This creates a large uncertainty in the yield expectation (e.g., +/−50%) making it difficult to balance customer serviceability and fabricator revenue, especially for an IC fabricator having multiple part numbers and/or multiple customers.

In view of the foregoing, there is a need in the art for an improved way to determine a yield expectation in an IC manufacturing facility that does not suffer from one or more of the problems of the related art.

SUMMARY OF THE INVENTION

A yield expectation determination is dynamically provided during manufacturing of a lot of integrated circuits. In one embodiment, the determination includes initially establishing a yield expectation for a lot, which can be based on a process grade, and adjusting the yield expectation during manufacturing based on test data from the kerf of a wafer. In addition, the yield expectation can be adjusted based on inspection data from optical and SEM inspection tools during manufacturing. Correlation coefficient models that correlate kerf data and inspection data to a yield expectation adjustment are used to dynamically adjust the yield expectation, resulting in a more accurate yield projection during manufacturing. The correlation coefficient models and/or process grade estimates are updated based on actual yield from a previous lot, thus further improving yield expectation accuracy.

A first aspect of the invention provides a method for determining a yield expectation in an integrated circuit manufacturing facility, the method comprising the steps of: initially establishing a yield expectation for a lot of wafers; and adjusting the yield expectation during manufacturing of the lot based on test data from a kerf of a wafer.

A second aspect of the invention provides a system for determining a yield expectation in an integrated circuit (IC) manufacturing facility, the system comprising: an establisher for initially establishing a yield expectation for a lot of wafers; and an adjuster for adjusting the yield expectation during manufacturing of the lot based on test data from a kerf of a wafer.

A third aspect of the invention provides a program product stored on a computer-readable medium, which when executed, determines a yield expectation in an integrated circuit (IC) manufacturing facility, the program product comprising: program code for initially establishing a yield expectation for a lot of wafers; and program code for adjusting the yield expectation during manufacturing of the lot based on test data from a kerf of a wafer.

A fourth aspect of the invention provides a computer-readable medium that includes computer program code to enable a computer infrastructure to determine a yield expectation in an integrated circuit (IC) manufacturing facility, the computer-readable medium comprising computer program code for performing the method steps of the invention.

An fifth aspect of the invention provides a business method for determining a yield expectation in an integrated circuit (IC) manufacturing facility, the business method comprising managing a computer infrastructure that performs each of the steps of the invention; and receiving payment based on the managing step.

A sixth aspect of the invention provides a method of generating a system for determining a yield expectation in an integrated circuit (IC) manufacturing facility, the method comprising: obtaining a computer infrastructure; and deploying means for performing each of the steps of the invention to the computer infrastructure.

The illustrative aspects of the present invention are designed to solve the one or more of the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

Figure 1:
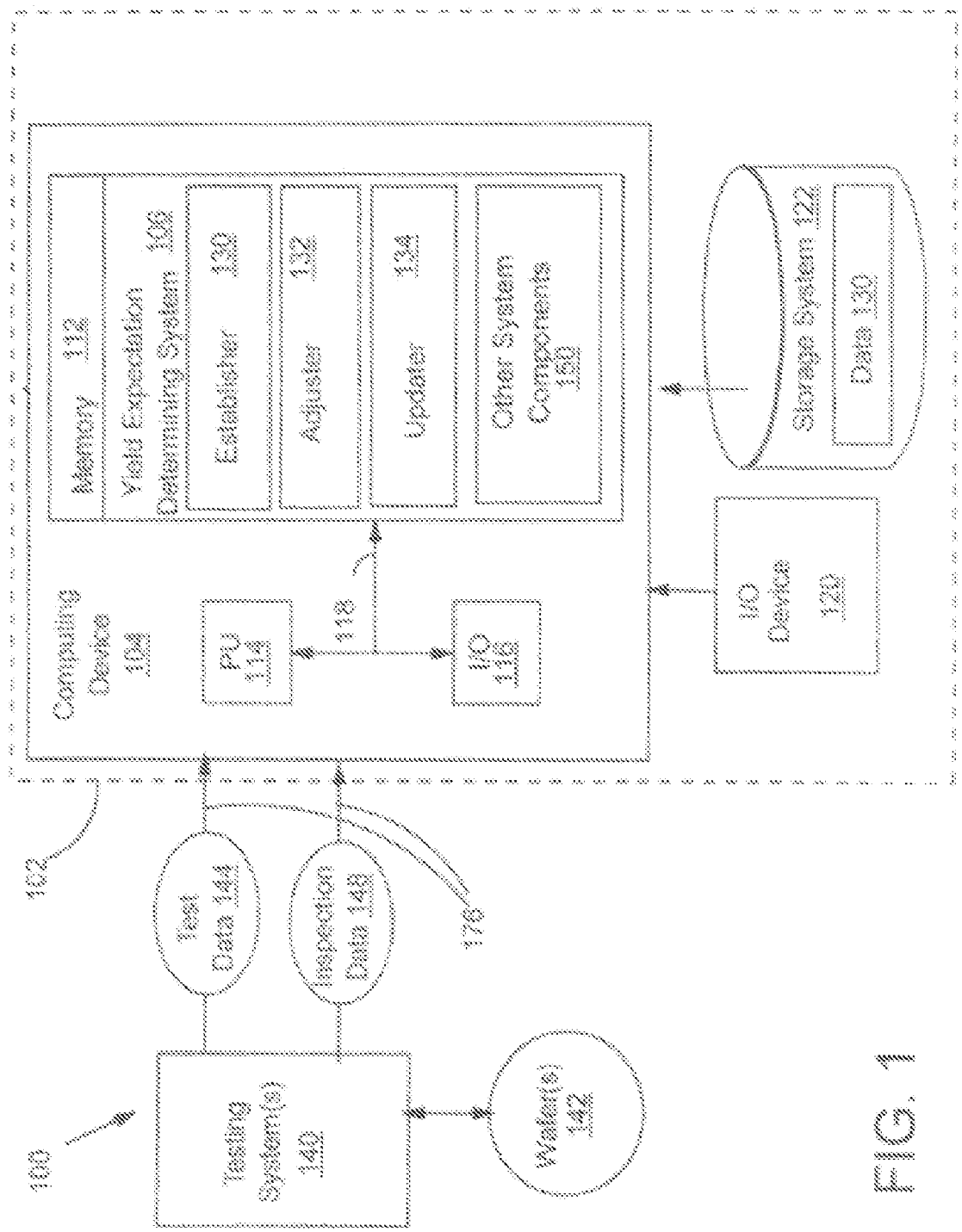
FIG. 1 shows a block diagram of a computer infrastructure including a yield expectation determining system according to the invention.

Turning to the drawings, FIG. 1 shows an illustrative environment 100 for dynamically determining a yield expectation according to the invention. To this extent, environment 100 includes a computer infrastructure 102 that can perform the various process steps described herein for dynamically determining a yield expectation. In particular, computer infrastructure 102 is shown including a computing device 104 that comprises a yield expectation determining system 106, which enables computing device 104 to determine a yield expectation by performing the process steps of the invention. While the invention will be described relative to an integrated circuit (IC) manufacturing facility or fabricator, it should be recognized that the teachings of the invention may be applied to other enterprises in which product can be routinely tested during fabrication.

Computing device 104 is shown including a memory 112, a processor (PU)114, an input/output (I/O) interface 116, and a bus 118. Further, computing device 104 is shown in communication with an external I/O device/resource 120 and a storage system 122. As is known in the art, in general, processor 114 executes computer program code, such as yield expectation determining system 106, which is stored in memory 112 and/or storage system 122. While executing computer program code, processor 114 can read and/or write data, such as test data from a kerf of a wafer and/or other data, to/from memory 112, storage system 122, and/or I/O interface 116. Bus 118 provides a communications link between each of the components in computing device 104. I/O device 118 can comprise any device that enables a user to interact with computing device 104 or any device that enables computing device 104 to communicate with one or more other computing devices.

In any event, computing device 104 can comprise any general purpose computing article of manufacture capable of executing computer program code (e.g., a personal computer, server, handheld device, etc.). However, it is understood that computing device 104 and yield expectation determining system 106 are only representative of various possible equivalent computing devices that may perform the various process steps of the invention. To this extent, in other embodiments, computing device 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 102 is only illustrative of various types of computer infrastructures for implementing the invention. For example, in one embodiment, computer infrastructure 102 comprises two or more computing devices (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computing devices may utilize any combination of various types of transmission techniques.

To this extent, computer infrastructure 102 can be connected to a testing system 140. Testing system 140 may include equipment for testing any now known or later developed test structure provided in a kerf of a wafer(s) 142 during manufacturing, resulting in test data 144. In addition, testing system 140 may include any now known or later developed inspection tool, e.g., optical or scanning electron microscope (SEM) inspection tools, which tests a wafer(s) 142 and produces inspection data 148 (also known as defect density data). Testing system 140 is shown in communication with computing device 104 over a communications link 176. As discussed above, communications link 176 can comprise any combination of various types of communications links as is known in the art. Regardless, it is understood that testing system 140 can comprise the same components (processor, memory, I/O interface, etc.) as shown for computing device 104. These components have not been separately shown and discussed for brevity.

As previously mentioned and discussed further below, yield expectation determining system 106 enables computing infrastructure 102 to determine a yield expectation. To this extent, yield expectation determining system 106 is shown including an establisher 130, an adjuster 132, an updater 134 and other system components 150. Other system components 150 may include any other now known or later developed functionality desired for operation of system 106. Operation of each of these systems is discussed further below. However, it is understood that some of the various systems shown in FIG. 1 can be implemented independently, combined, and/or stored in memory for one or more separate computing devices that are included in computer infrastructure 102. Further, it is understood that some of the systems and/or functionality may not be implemented, or additional systems and/or functionality may be included as part of environment 100.

Figure 2:
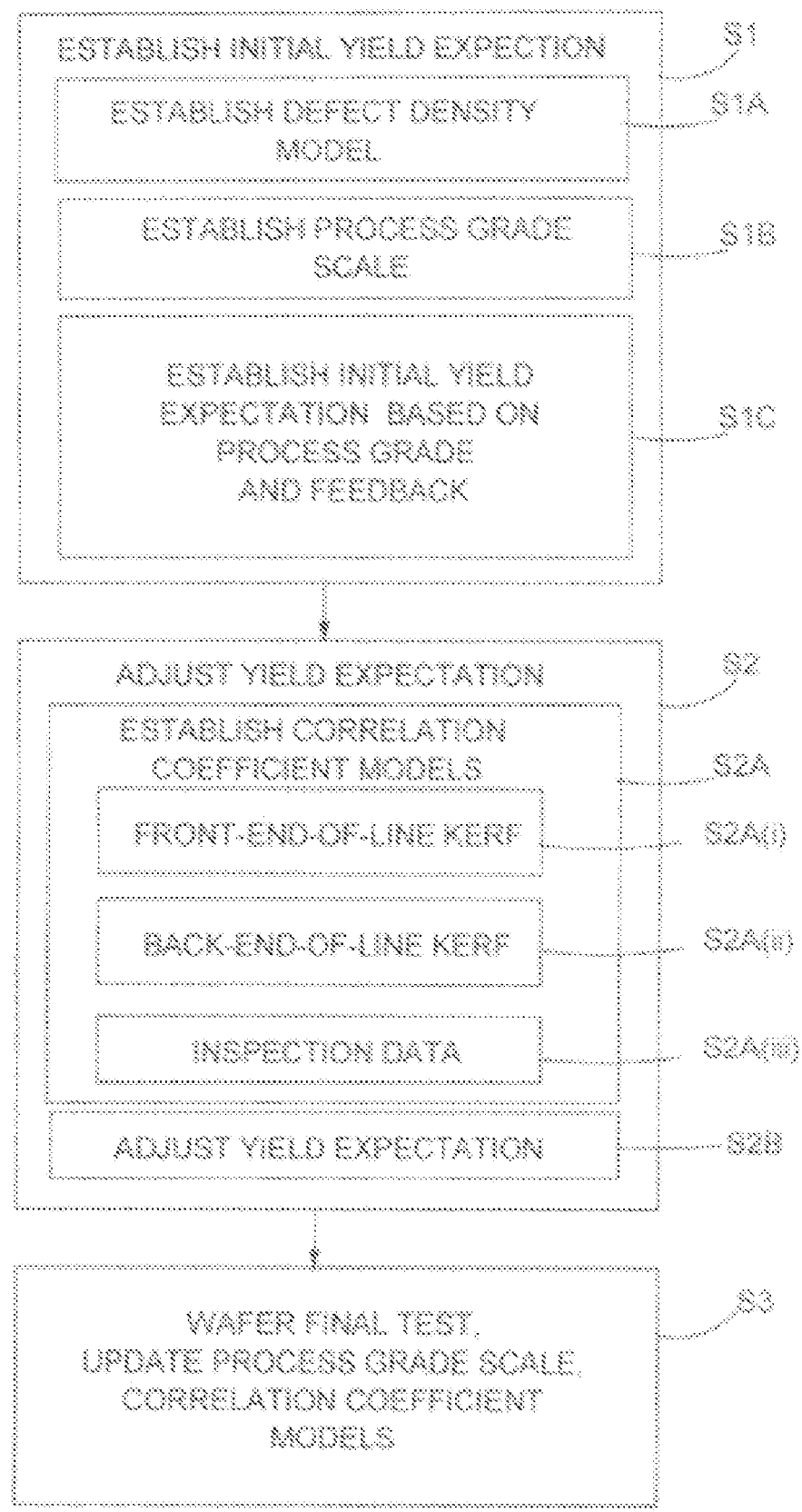
FIG. 2 shows a flow diagram of one embodiment of operation of the yield expectation determining system of FIG. 1.

Turning to FIG. 2 in conjunction with FIG. 1, one embodiment of a method of operation of system 106 will now be described. In the following description, it is understood that 'yield' can be determined in a variety of ways. For example, yield may be based on the elimination of defects, performance requirements (speed, power consumption, etc.), etc.

In step S1, establisher 130 initially establishes a yield expectation for a lot. In one embodiment, the initial yield expectation may be established for a lot based on a process grade and feedback (if any). A "process grade" is an assigned rating based on a defect density model and what process recipe a wafer will see. Each process grade has an initial yield expectation associated therewith that is based on a corresponding defect density model yield estimate and a process grade yield increment. A "defect density model" is any now known or later developed model for predicting yield on an integrated circuit (IC). A defect density (DD) model yield estimate is based on the circuit counts and types, critical area, and historical defect density. A "process grade yield increment" is an adjustment value for the defect density yield estimate that is based on an estimated yield improvement for each unique process for that particular process grade. The defect density model yield estimates and the process grade yield increments may be adjusted based on actual yield of lots with the given yield improvement. Feedback is based on results from wafer final test, step S3.

As a sub-step S1A of step S1, establisher 130 may (at an initial pass or prior thereto) establish a defect density model. As noted above, a defect density model estimates yield based on the circuit counts and types, critical area, and historical defect density. In one embodiment, the defect density model estimates yield as a product of the random yield defects and the systematic yield losses. The fault density is defined as the critical area of a circuit times the defect density. Each circuit type has its own fault density. The random defect yield is proportional to one over the fault density. The systematic yield is based on historical learning and accounts for product/process interactions, product topology and test/circuit margin. Using the product unique circuit count/type, critical area, redundancy and systematic yield, an estimate of the IC yield before wafer fabrication can be calculated. It should be recognized that the above-described embodiment for establishing a defect density model is only illustrative and other methods may be used based on other criteria and calculations.

As a sub-step S1B of step S1, establisher 130 may (at an initial pass or prior thereto) establish a process grade scale. Each process used in manufacturing an IC has a certain process grade yield increment that can be attributed thereto. For example, a certain process may be known, or estimated, to result in a 5% increase in a yield expectation. Analysis of the processes used during IC manufacturing results in similar data for each process, which establisher 130 converts into a process grade scale. Each process grade includes an initial yield expectation for a lot exposed to processes having that grade based on the defect density model yield estimate and the process grade yield increment. The following table shows one illustrative process grade scale:

| PROCESS GRADE | DD MODEL YIELD ESTIMATE | PROCESS GRADE YIELD INCREMENT | INITIAL YIELD EXPECTATION |
|---|---|---|---|
| A | 15% | 0% | 15% |
| B | 20% | 2% | 22% |
| C | 25% | 5% | 30% |
| D | 30% | 3% | 33% |
| E | 30% | 10% | 40% |

In use, a lot is assigned a process grade based on its process recipe and an initial yield expectation based on the corresponding grade it is assigned. For example, any lot exposed to a process grade B would have a process grade yield increment expectation of 2% based on the above-described illustrative process grade scale, and an initial yield expectation of 22%. In one embodiment, the initial yield expectation is the sum of the defect density model yield estimate and the process grade yield increment. However, other combinations may be used.

In step S1C, establisher 130 establishes an initial yield expectation for a lot based on a process grade. As noted above, the initial yield expectation can be based, in part, on feedback from wafer final test, step S3. It should be recognized that steps S1A–S1C represent one illustrative manner of establishing an initial yield expectation and that other formulations are possible and considered within the scope of the invention. For example, in another embodiment, a wafer substrate measurement could be used with the DD model to calculate an initial yield expectation. Adjustments could then be completed based on (raw) wafer substrate measurements. For example, if the actual yield is significantly different for different wafer vendors, e.g., because they use different processes to make the raw wafer, adjustments could be made based on that information. In addition, silicon thickness of the raw wafer also affects yield. These are measurement/characteristics that are known for each wafer even before processing starts. In another embodiment, the initial yield expectation could also be based on the yields of similar products, and adjusted based on the DD model.

In step S2, adjuster 132 adjusts the yield expectation during manufacturing of the lot based on test data 144 from a kerf of a wafer 142. In addition, in an alternative embodiment, adjuster 132 may adjust the yield expectation during manufacturing of the lot based on inspection data 148 (also known as defect density data). Sub-steps S2A–S2B represent introductory steps to the adjustment. In sub-step S2A, establisher 130 establishes correlation coefficient models, which are used by adjuster 132 to make adjustments to the yield expectation.

Turning to the details of sub-step S2A, establisher 130 may establish at least one correlation coefficient model for a variety of kerf test data 144 (S2A(i)–S2A(ii)) and inspection data 148 (also known as defect density data)(S2A(iii)) versus a yield expectation adjustment. Test data 144, as described above, includes results of testing any now known or later developed test structure provided in a kerf of a wafer(s) 142 during manufacturing. Typically, front-end-of-line (FEOL) kerf tests are of physical structure, while back-end-of-line (BEOL) kerf tests are of electrical parameters. For example, a correlation coefficient model can be established for one or more of the following kerf tests: a FEOL critical dimension measurement, a BEOL ring oscillator performance/power test, a BEOL electrical defect test, a BEOL memory array test, a BEOL antennae macro test and a BEOL health-of-line test. In addition, a correlation coefficient model can be established for one or more inspection tool based tests that result in inspection data.

In one embodiment, in sub-step S2A(i), at least one correlation coefficient model can be established that correlates a FEOL physical parameter versus a yield expectation adjustment based on a kerf test of the FEOL structure. An FEOL physical parameter can be any variable tested during FEOL formation, i.e., fabrication prior to the first metal layer. An FEOL parameter may include, for example, a critical dimension (CD) variation or an overlay variation. For example, a correlation coefficient model may mandate that where a CD variation is off by more than X %, a yield expectation should be decreased by Y %. The yield expectation and FEOL parameter correlations can be established based on wafer final test results (step S3).

In another embodiment, sub-step S2A(ii), at least one correlation coefficient model can be established that correlates a BEOL electrical parameter versus a yield expectation adjustment based on a kerf test of the BEOL structure. A BEOL electrical parameter can be any variable tested during BEOL formation, i.e., fabrication at or after the first metal layer. A BEOL electrical parameter may include, for example, ring oscillator performance/power test, a 'health-of-line' test, and a memory array test. For example, a correlation coefficient model may mandate that where a health-of-line is below X %, a yield expectation should be decreased by Y %. The yield expectation and BEOL parameter correlations can be established based on wafer final test results (step S3).

Figure 3:
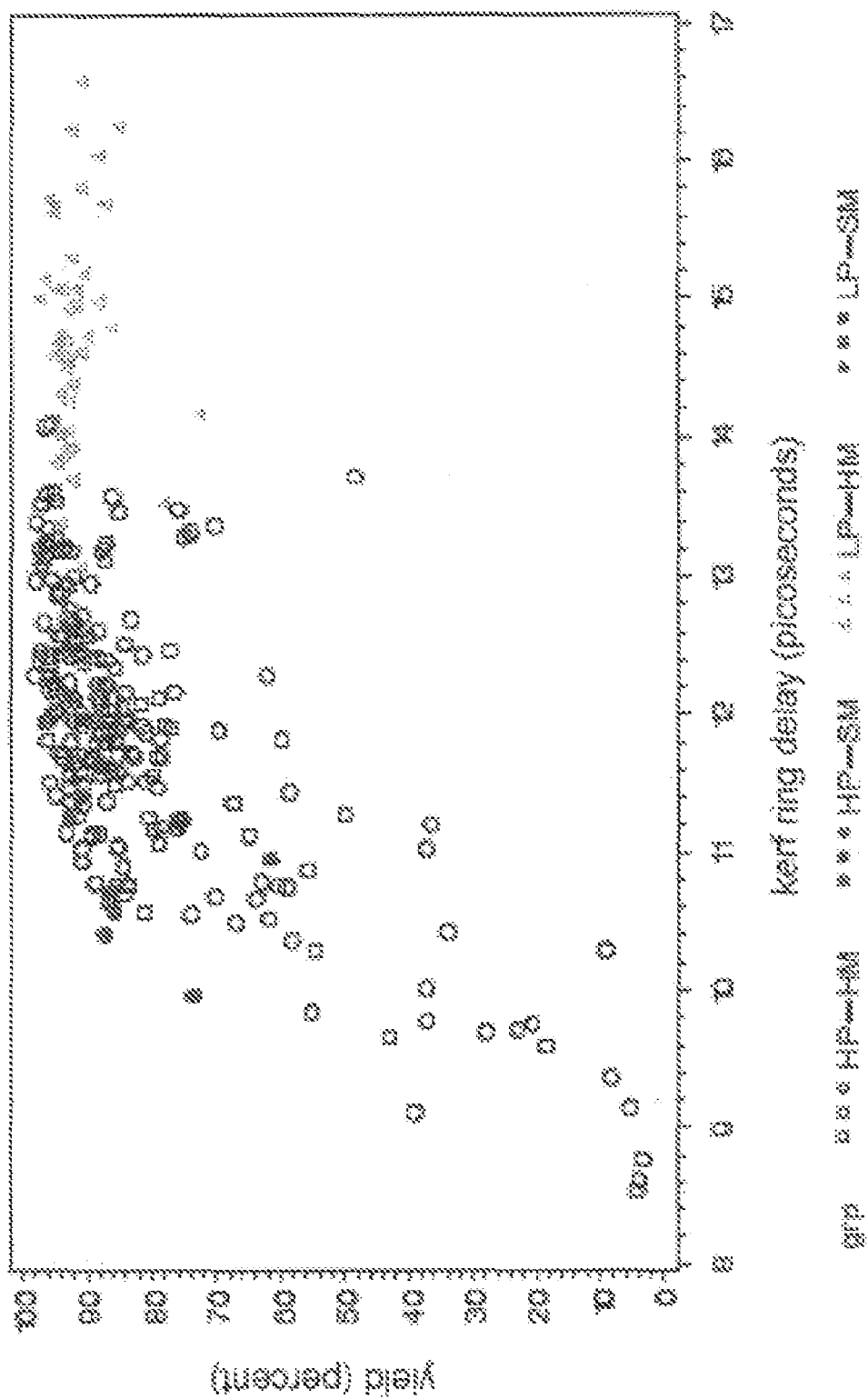
FIGS. 3–5 show graphs of test data from kerf tests of wafers used by the yield expectation determination system of FIG. 1.
Figure 4:
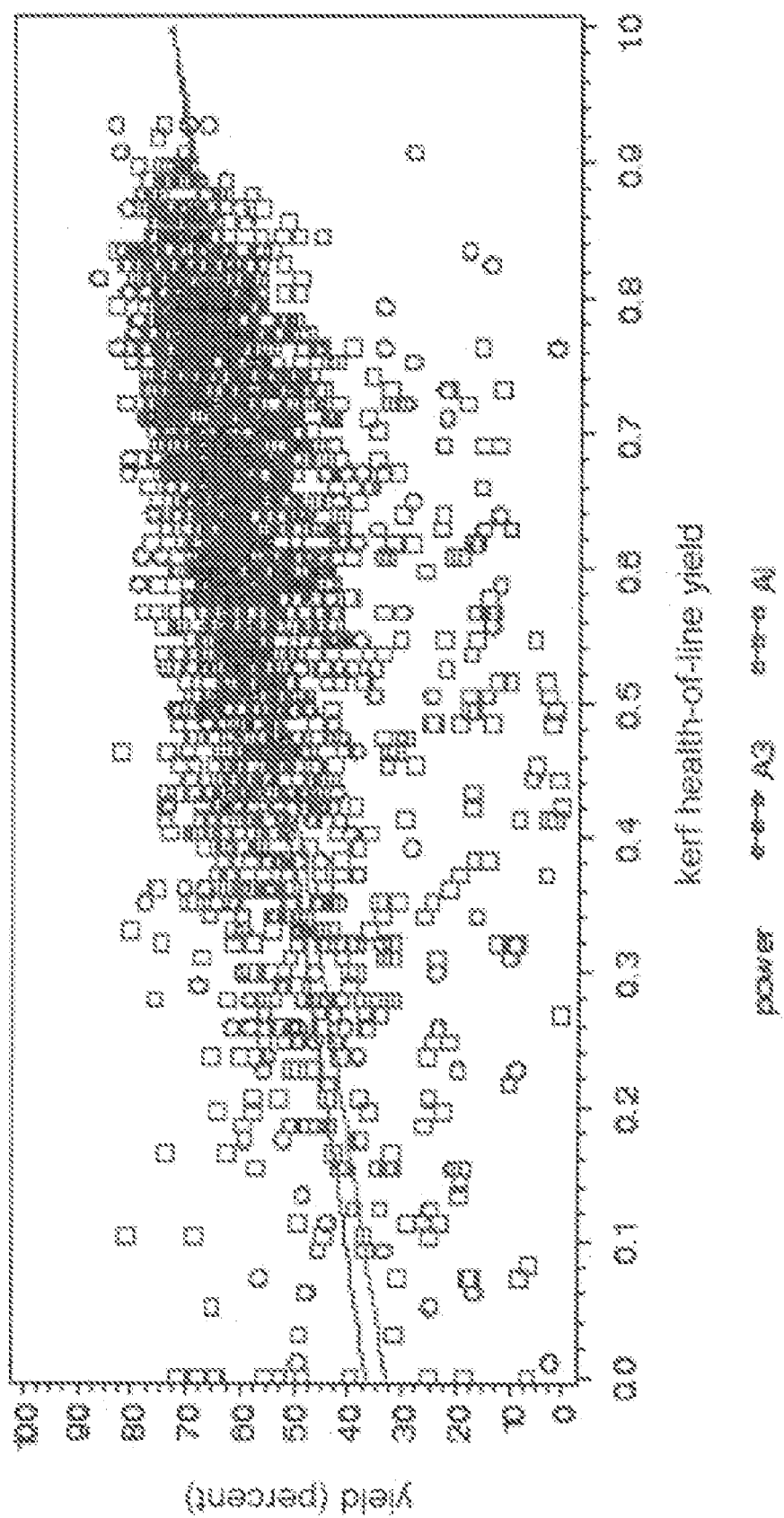
Figure 5:
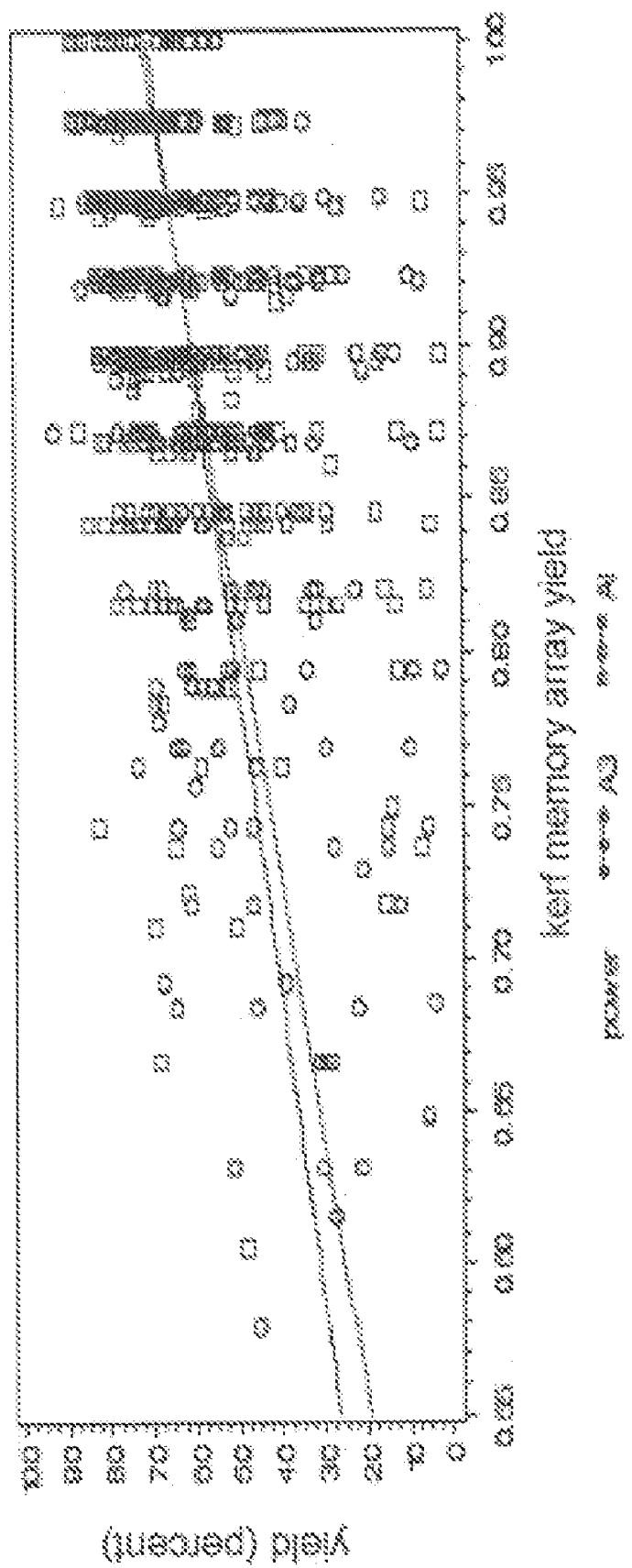

FIGS. 3–5 show various test results, with the horizontal axis indicating kerf test results and the vertical axis indicating some type of yield measure. FIG. 3 shows results from a BEOL ring oscillator performance/power test measured at a first metal level versus yield, FIG. 4 shows results from a BEOL electrical defect testing structure measured at a sixth metal level versus yield, and FIG. 5 shows results from a BEOL memory array test measured at a fourth metal level versus yield. An electrical defect test (FIG. 4) represents one type of 'health of line' (HOL) test in which defects such as shorts, opens, improper resistances, etc., are determined based on a certain power being applied to a structure. Based on the kerf test data and known yield results from final wafer test (step S3), correlation coefficient models can be established for each test. For example, for the ring oscillator test data shown in FIG. 3, where a performance speed of the ring oscillator test result falls below 10 picoseconds (ps), a correlation coefficient model may mandate a yield expectation decrease to less than 70%. In FIG. 4, a more linear relationship between the electrical defect yield and wafer lot yield is illustrated. In FIG. 5, a more linear relationship between array yield and wafer lot yield is illustrated.

Returning to FIG. 2, in addition to correlation coefficient models based on FEOL and BEOL kerf tests, step S2A(iii), at least one correlation coefficient model can be established that correlates inspection data 148 versus a yield expectation adjustment. An inspection tool parameter can be any variable tested during manufacturing, i.e., may be measured at FEOL and/or BEOL. An inspection tool parameter may include, for example, a defect type, a defect count, and a defect distribution. For example, a correlation coefficient model may mandate that where a CD variation is off by more than X %, a yield expectation should be decreased by Y %.

In step S2B, adjuster 132 adjusts the (initial) yield expectation during manufacturing based on test data 144 from a kerf of a wafer, e.g., based on FEOL physical and/or BEOL electrical test data from a kerf of a wafer. In addition, in an alternative embodiment, adjuster 132 may adjust yield expectation during manufacturing based on inspection data 148 from optical or SEM inspection tools. In particular, adjuster 132 adjusts the yield expectation based on the at least one correlation coefficient model that correlates test data 144 from the kerf, and, in the alternative embodiment, inspection data 148 from optical inspection. For example, if a correlation coefficient model indicates that an X % reduction in a health-of-line test result in a Z % reduction in yield, then the yield would be reduced by Z %. In any event, adjuster 132 may adjust a yield expectation during any stage of IC manufacturing in which a kerf test or optical inspection is conducted: front-end-of-line formation and back-end-of-line formation (after first metal formation). Overall, yield expectation can be dynamically adjusted during any stage of IC manufacturing.

In step S3, a wafer final test is performed by testing system 140, and actual yields are determined. Based on the actual yield results, updater 134 updates at least one correlation coefficient model. In addition, updater 134 may further provide the above-described feedback by updating the process grade scale. In this fashion, yield expectation accuracy can be continually improved.

The above-described embodiments allow for a yield expectation that improves predicted wafer yields to within approximately 10% at least four weeks prior to wafer final test. In addition, the above-described embodiment has an improved accuracy over one that is only based on scanning electron microscope (SEM) yield data. The embodiments described can predict die yield on a lot-by-lot and weekly basis. The differences between actual yield and yield expectation is monitored and used to improve future predictions. One advantage of having a lot-by-lot yield projection is that it allows the fabricator to assign different lot priorities to maximize serviceability in cases of yield downturns. The projected yield by week is used by the fabricator integrated supply chain and the customer for planning shipments with high confidence. The yield expectation together with the kerf test data is used to set inline yield targets and for process module 'health' feedback, i.e., to correct processes where necessary. In addition to a yield expectation, the embodiments described also allow prediction of microprocessor performance.

It is understood that the order of the above-described steps is only illustrative. To this extent, one or more steps can be performed in parallel, in a different order, at a remote time, etc. Further, one or more of the steps may not be performed in various embodiments of the invention.

While shown and described herein as a method and system for determining a yield expectation, it is understood that the invention further provides various alternative embodiments. For example, in one embodiment, the invention provides a computer-readable medium that includes computer program code to enable a computer infrastructure to determine a yield expectation. To this extent, the computer-readable medium includes program code, such as yield expectation determining system 106 (FIG. 1), which implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 112 (FIG. 1) and/or storage system 122 (FIG. 1) (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider, such as an Application Service Provider, could offer to determine a yield expectation as described above. In this case, the service provider can manage (e.g., create, maintain, support, etc.) a computer infrastructure, such as computer infrastructure 102 (FIG. 1), that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for determining a yield expectation. In this case, a computer infrastructure, such as computer infrastructure 102 (FIG. 1), can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computing device, such as computing device 104 (FIG. 1), from a computer-readable medium; (2) adding one or more computing devices to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for determining a yield expectation in an integrated circuit manufacturing facility, the method comprising the steps of:
   initially establishing a yield expectation for a lot of wafers; and
   adjusting the yield expectation during manufacturing of the lot based on test data from a kerf of a wafer.

2. The method of claim 1, further comprising the step of establishing a process grade scale, and wherein the initially establishing step includes establishing the yield expectation for the lot based on a process grade from the process grade scale, each process grade including an initial yield expectation.

3. The method of claim 2, further comprising the step of updating the process grade scale based on an actual yield of the lot.

4. The method of claim 1, wherein the adjusting step further includes adjusting the yield expectation during manufacturing based on inspection data from at least one inspection tool.

5. The method of claim 4, wherein the adjusting step further includes adjusting the yield expectation based on at least one correlation coefficient model that correlates at least one of the following: the inspection data to a yield expectation adjustment, electrical test data from the kerf to a yield expectation adjustment, and physical test data from the kerf to a yield expectation adjustment.

6. The method of claim 5, wherein the at least one correlation coefficient model includes a correlation coefficient model for at least one of the following kerf tests: a front-end-of-line (FEOL) critical dimension measurement, a back-end-of-line (BEOL) ring oscillator performance/power test, a BEOL electrical defect test, a BEOL memory array test, a BEOL antennae macro test and a BEOL health-of-line test.

7. The method of claim 4, further comprising the step of updating at least one correlation coefficient model based on an actual yield of the lot.

8. The method of claim 1, wherein the adjusting step includes adjusting the yield expectation based on at least one correlation coefficient model that correlates at least one of the following: inspection data to a yield expectation adjustment, electrical test data from the kerf to a yield expectation adjustment, and physical test data from the kerf to a yield expectation adjustment.

9. The method of claim 8, further comprising the step of updating each correlation coefficient model based on an actual yield of the lot.

10. A system for determining a yield expectation in an integrated circuit (IC) manufacturing facility, the system comprising:
    an establisher for initially establishing a yield expectation for a lot of wafers; and
    an adjuster for adjusting the yield expectation during manufacturing of the lot based on test data from a kerf of a wafer.

11. The system of claim 10, wherein the establisher further establishes a process grade scale, and establishes the yield expectation for the lot based on a process grade from the process grade scale, each process grade including an initial yield expectation.

12. The system of claim 11, further comprising an updater for updating the process grade scale based on an actual yield of the lot.

13. The system of claim 10, wherein the adjuster further adjusts the yield expectation during manufacturing based on inspection data from at least one inspection tool.

14. The system of claim 13, wherein the adjuster further adjusts the yield expectation based on at least one correlation coefficient model that correlates at least one of the following: the inspection data to a yield expectation adjustment, electrical test data from the kerf to a yield expectation adjustment, and physical test data from the kerf to a yield expectation adjustment.

15. The system of claim 14, wherein the at least one correlation coefficient model includes a correlation coefficient model for at least one of the following kerf tests: a front-end-of-line (FEOL) critical dimension measurement, a back-end-of-line (BEOL) ring oscillator performance/power test, a BEOL electrical defect test, a BEOL memory array test, a BEOL antennae macro test and a BEOL health-of-line test.

16. The system of claim 13, further comprising an updater for updating at least one correlation coefficient model based on an actual yield of the lot.

17. The system of claim 10, wherein the adjuster adjusts the yield expectation based on at least one correlation coefficient model that correlates at least one of the following:
    inspection data to a yield expectation adjustment, electrical test data from the kerf to a yield expectation adjustment, and physical test data from the kerf to a yield expectation adjustment.

18. The system of claim 16, further comprising an updater for updating each correlation coefficient model based on an actual yield of the lot.

19. A program product stored on a computer-readable medium, which when executed, determines a yield expectation in an integrated circuit (IC) manufacturing facility, the program product comprising:
    program code for initially establishing a yield expectation for a lot of wafers; and
    program code for adjusting the yield expectation during manufacturing of the lot based on test data from a kerf of a wafer.

20. The program product of claim 19, wherein the establishing code establishes at least one correlation coefficient model that correlates the test data from the kerf to a yield expectation adjustment, and the adjusting code adjusts the yield expectation based on the at least one correlation coefficient model.

* * * * *